(12) United States Patent
Lin (10) Patent No.: US 10,592,232 B2
(45) Date of Patent: Mar. 17, 2020

(54) PRESERVING FIRMWARE SETTING DURING FIRMWARE UPDATE

(71) Applicant: QUANTA COMPUTER INC., Taoyuan (TW)

(72) Inventor: Yu-Han Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 269 days.

(21) Appl. No.: 15/715,357

(22) Filed: Sep. 26, 2017

(65) Prior Publication Data

US 2019/0095195 A1 Mar. 28, 2019

(51) Int. Cl.
*G06F 8/65* (2018.01)
*G06F 8/654* (2018.01)
*G06F 9/4401* (2018.01)

(52) U.S. Cl.
CPC ............ *G06F 8/654* (2018.02); *G06F 9/4406* (2013.01)

(58) Field of Classification Search
CPC .................................. G06F 8/65; G06F 8/654
See application file for complete search history.

(56) References Cited

U.S. PATENT DOCUMENTS

| 2003/0033515 A1* | 2/2003 | Autry | G06F 8/65 713/100 |
| 2003/0204711 A1* | 10/2003 | Guess | G06F 9/44505 713/1 |
| 2005/0223372 A1* | 10/2005 | Borchers | G06F 8/65 717/168 |
| 2011/0099544 A1 | 4/2011 | Haramiishi et al. | |
| 2017/0031694 A1 | 2/2017 | Chu et al. | |

(Continued)

FOREIGN PATENT DOCUMENTS

| CN | 1469252 A | 1/2004 |
| JP | H0816408 A | 1/1996 |

(Continued)

OTHER PUBLICATIONS

TW Office Action for Application No. 106141967, dated Jul. 10, 2018, w/ First Office Action Summary.

(Continued)

*Primary Examiner* — Albert Wang
(74) *Attorney, Agent, or Firm* — Nixon Peabody LLP; Zhou Lu (57) ABSTRACT

The present disclosure provides a system and method for preserving firmware settings in a baseboard management controller (BMC) or a flash memory component of a server system. In accordance with one aspect of the present disclosure, a computer-implemented method for automatically preserving firmware settings of the server system, comprises: powering on the server system; retrieving a plurality of future firmware settings from a baseboard management controller (BMC) of the server system; applying the plurality of future firmware settings to the server system; sending a plurality of current firmware settings to the BMC with a unique string mapping scheme; performing an entire firmware flash update; copying the plurality of current firmware settings stored on the BMC to the plurality of future firmware settings of the BMC; and rebooting the server system by applying the plurality of future firmware settings stored on the BMC.

20 Claims, 6 Drawing Sheets

(56) References Cited

U.S. PATENT DOCUMENTS

2017/0046151 A1  2/2017  Hsu
2017/0090896 A1  3/2017  Lin

FOREIGN PATENT DOCUMENTS

| | | |
|---|---|---|
| JP | 2015060411 A | 3/2015 |
| JP | 2016058071 A | 4/2016 |
| JP | 2016-157245 A | 9/2016 |
| JP | 2017058992 A | 3/2017 |
| TW | 201222413 A | 6/2012 |
| TW | 201717001 A | 5/2017 |

OTHER PUBLICATIONS

TW Search Report for Application No. 106141967, (report conducted Jul. 4, 2018) mailed with First Office Action dated Jul. 10, 2018.

Extended European Search Report for EP Application No. 18152241.8, dated Jun. 15, 2018.

JP Office Action for Application No. 2018-028287, dated Nov. 6, 2018, w/ First Office Action Summary.

\* cited by examiner

PRESERVING FIRMWARE SETTING DURING FIRMWARE UPDATE

FIELD OF THE INVENTION

The disclosure generally relates to firmware update in a computing system.

BACKGROUND

Modern server farms or datacenters typically employ a number of server systems to handle processing and storage needs for a variety of application services. A server system employs various component devices. Firmware, supporting each of these component devices, need be periodically updated to ensure proper functioning of the devices.

However, if firmware settings were previously changed in the past, those firmware settings need to be preserved during firmware updates on a server system. Otherwise, a user or administrator would have to re-customize the firmware settings. It remains a challenge to preserve firmware settings (e.g., BIOS settings) during firmware updates.

SUMMARY

Systems and methods, in accordance with various examples of the present disclosure, provide a solution to the above-mentioned problems by preserving firmware settings in a baseboard management controller (BMC), or a flash memory component of a server system. The BMC can store both "future firmware settings" and "current firmware setting." The "future firmware settings" refer to firmware settings that need to be changed in a next system reboot. The "current firmware settings" refer to firmware settings that are currently on the server system.

In accordance with one aspect of the present disclosure, a computer-implemented method for automatically preserving firmware settings of a server system, comprises: (1) powering on a server system; (2) retrieving a plurality of future firmware settings from a baseboard management controller (BMC) of the server system; (3) applying the plurality of future firmware settings to the server system; (4) sending a plurality of current firmware settings to the BMC with a unique string mapping scheme; (5) performing an entire firmware flash update; (6) copying the plurality of current firmware settings stored on the BMC to the plurality of future firmware settings of the BMC; and (7) rebooting the server system by applying the plurality of future firmware settings stored on the BMC. In some examples, the computer-implemented method can be performed by at least one of BMC or an additional processor of the server system.

In some implementations, the BMC is connected to a network and can be accessible out-of-band. The plurality of future firmware settings stored on the BMC can be updated when the server system is not in operation, or even when the server system is powered off.

In some examples, the unique string mapping scheme comprises mapping each of the plurality of current firmware settings to a unique string. In some implementations, the unique string mapping scheme further comprises recording a changed current firmware setting with a unique string mapping type.

In accordance with one aspect of the present disclosure, a computer-implemented method for automatically preserving firmware settings of a server system, comprises: (1) receiving a plurality of future firmware settings from a user of a server system; (2) sending the plurality of future firmware settings to a BIOS to be applied to the server system; (3) receiving a plurality of current firmware settings from the BIOS, the plurality of current firmware settings being retrieved by the BIOS using a unique string mapping scheme; (4) causing the BIOS to perform entire firmware flash update; (5) copying the plurality of current firmware settings stored on the BMC to the plurality of future firmware settings of the BMC; and (6) causing the server system to be rebooted from the plurality of future firmware setting stored on the BMC.

In accordance with one aspect of the present disclosure, a computer-implemented method for automatically preserving firmware settings of a server system, comprises: (1) powering on the server system; (2) saving a plurality of firmware settings in a first flash chip of the server system; (3) saving the plurality of firmware settings in a second flash chip of the server system; (4) performing a firmware update by updating the first flash chip; (5) retrieving the plurality of firmware settings stored in the second flash ship; and (6) rebooting the server system by applying the plurality of firmware settings retrieved from the second flash chip to the server system.

In accordance with another aspect of the present disclosure, a non-transitory computer-readable storage medium storing instructions is provided. The instructions, when executed by a processor, cause the processor to perform operations including: (1) powering on a server system; (2) retrieving a plurality of future firmware settings from a BMC of the server system; (3) applying the plurality of future firmware settings to the server system; (4) sending a plurality of current firmware settings to the BMC with a unique string mapping scheme; (5) performing an entire firmware flash update; (6) copying the plurality of current firmware settings stored on the BMC to the plurality of future firmware settings of the BMC; and (7) rebooting the server system by applying the plurality of future firmware settings stored on the BMC.

In accordance with another aspect of the present disclosure, a non-transitory computer-readable storage medium storing instructions is provided. The instructions, when executed by a processor, cause the processor to perform operations including: (1) receiving a plurality of future firmware settings from a user of a server system; (2) sending the plurality of future firmware settings to a BIOS to be applied to the server system; (3) receiving a plurality of current firmware settings from the BIOS, the plurality of current firmware settings being retrieved by the BIOS using a unique string mapping scheme; (4) causing the BIOS to perform an entire firmware flash update; (5) copying the plurality of current firmware settings stored on the BMC to the plurality of future firmware settings of the BMC; and (6) causing the server system to be rebooted from the plurality of future firmware setting stored on the BMC.

In accordance with another aspect of the present disclosure, a non-transitory computer-readable storage medium storing instructions is provided. The instructions, when executed by a processor, cause the processor to perform operations including: (1) powering on the server system; (2) saving a plurality of firmware settings in a first flash chip of the server system; (3) saving the plurality of firmware settings in a second flash chip of the server system; (4) performing a firmware update by updating the first flash chip; (5) retrieving the plurality of firmware settings stored in the second flash ship; and (6) rebooting the server system by applying the plurality of firmware settings retrieved from the second flash chip to the server system.

According to some configurations, a BMC or a flash memory device can be used to preserve firmware settings of a server system. The flash memory device on the server system can be configured to be accessed by the BMC and a central processing unit (CPU) on the server system. The flash memory device can be any storage medium configured to store program instructions or data for a period of time. According to some examples, the flash storage device can be a flash drive, a random access memory (RAM), a non-volatile random-access memory (NVRAM), an electrically erasable programmable read-only memory (EEPROM), or a mailbox register.

Additional features and advantages of the disclosure will be set forth in the description which follows, and in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. These drawings depict only example aspects of the disclosure and are not therefore to be considered to be limiting of its scope. The principles herein are described and explained with additional specificity and detail through the use of the accompanying drawings in which.

DETAILED DESCRIPTION

The present disclosure can be embodied in many different forms. Representative embodiments are shown in the drawings, and will herein be described in detail, with the understanding that the present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed: the singular includes the plural and vice versa; and the word "including" means "including without limitation." Moreover, words of approximation, such as "about," "almost," "substantially," "approximately," and the like, can be used herein to mean "at, near, or nearly at," or "within 3-5% of," or "within acceptable manufacturing tolerances," or any logical combination thereof, for example.

Various examples of the present disclosure provide systems and methods for preserving firmware settings in a baseboard management controller (BMC), or a flash memory component of a server system. The BMC can store both "future firmware settings" and "current firmware setting" during firmware update. Throughout this application, the terms BIOS and firmware are used interchangeably to refer to the combination of a hardware device and computer instructions that reside on that hardware device, such as a basic input/output system (BIOS), or unified extensible firmware interface (UEFI) on a computer motherboard.

Figure 1:
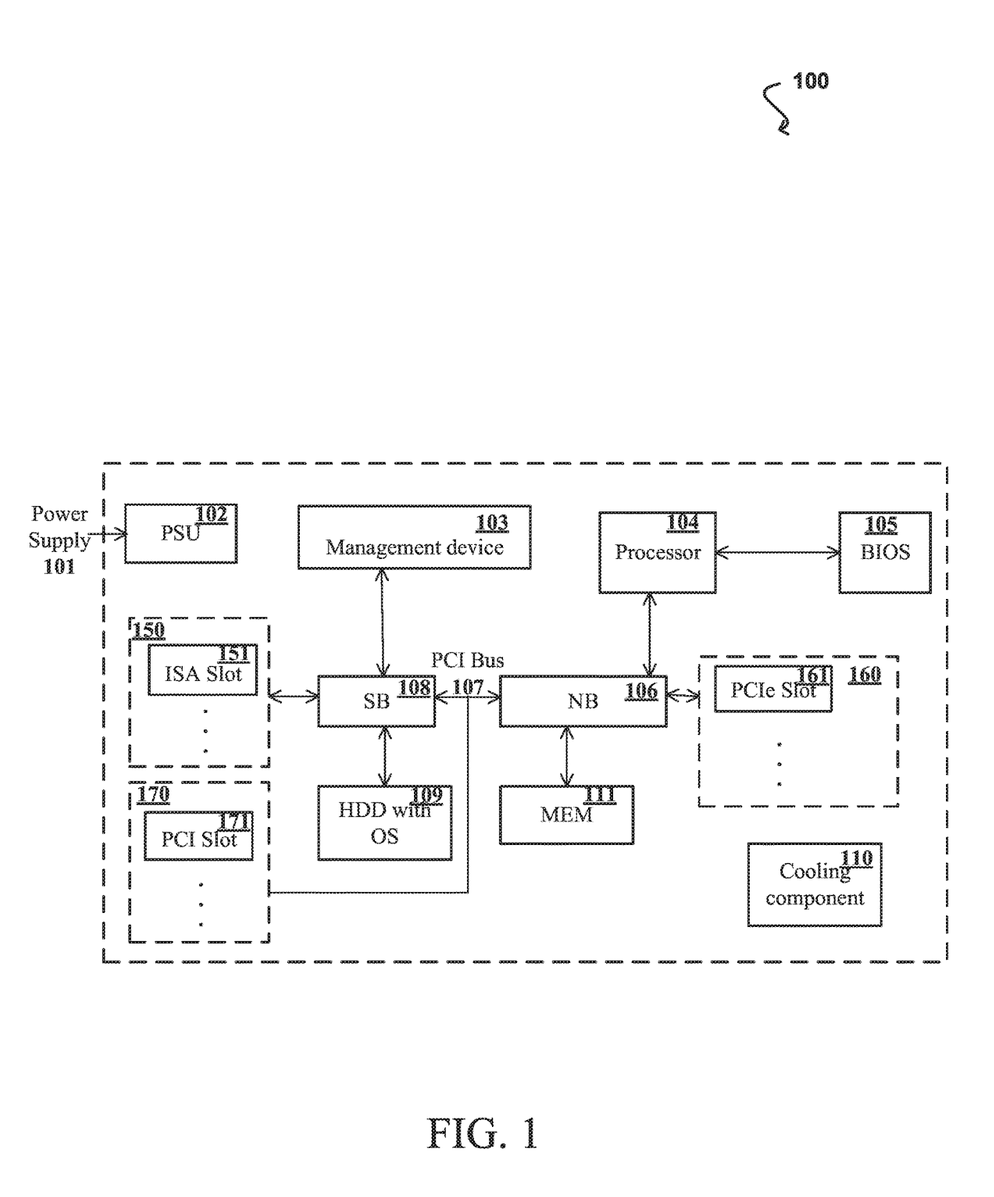
FIG. 1 is a schematic block diagram illustrating exemplary system in a datacenter for automatically preserving firmware settings, in accordance with an implementation of the present disclosure.

FIG. 1 is a schematic block diagram illustrating an exemplary server system 100 configured to automatically preserving firmware settings in accordance with an implementation of the present disclosure. In this example, the server system 100 includes at least one microprocessor or processor 104, one or more cooling components 110, a main memory (MEM) 111, at least one power supply unit (PSU) 102 that receives an AC power from an AC power supply 101, and provide power to various components of the server system 100, such as the processor 104, north bridge (NB) logic 106, PCIe slots 160, south bridge (SB) logic 108, storage device 109, ISA slots 150, PCI slots 170, and a management controller 103. After being powered on, the server system 100 is configured to load software application from memory, a computer storage device, or an external storage device to perform various operations. The storage device 109 is structured into logical blocks that are available to an operating system and applications of the server system 100. The storage device 109 is configured to retain server data even when the server system 100 is powered off.

In FIG. 1, the memory 111 is coupled to the processor 104 via the NB logic 106. The memory 111 may include, but is not limited to, dynamic random access memory (DRAM), double data rate DRAM (DDR DRAM), static RAM (SRAM), or other types of suitable memory. The memory 111 can be configured to store firmware data of the server system 100. In some configurations, firmware data can be stored on the storage device 109.

In some implementations, the server system 100 can further comprise a flash storage device. The flash storage device can be a flash drive, a random access memory (RAM), a non-volatile random-access memory (NVRAM), or an electrically erasable programmable read-only memory (EEPROM). The flash storage device can be configured to store the system configurations such as firmware data.

The processor 104 can be a central processing unit (CPU) configured to execute program instructions for specific functions. For example, during a booting process, the processor 104 can access firmware data stored in the management device 103 or the flash storage device, and execute the BIOS 105 to initialize the server system 100. After the booting process, the processor 104 can execute an operating system in order to perform and manage specific tasks for the server system 100.

In some configurations, the processor 104 can be multi-core processors, each of which is coupled together through a CPU bus connected to the NB logic 106. In some configurations, the NB logic 106 can be integrated into the processor 104. The NB logic 106 can also be connected to a plurality of peripheral component interconnect express (PCIe) slots 160 and an SB logic 108 (optional). The plurality of PCIe slots 160 can be used for connections and buses such as PCI Express x1, USB 2.0, SMBus, SIM card, future extension for another PCIe lane, 1.5 V and 3.3 V power, and wires to diagnostics LEDs on the server system 100's chassis.

In system 100, the NB logic 106 and the SB logic 108 are connected by a peripheral component interconnect (PCI) Bus 107. The PCI Bus 107 can support function on the processor 104 but in a standardized format that is independent of any of the processor 104's native buses. The PCI Bus 107 can be further connected to a plurality of PCI slots 170 (e.g., a PCI slot 171). Devices connect to the PCI Bus 107 may appear to a bus controller (not shown) to be connected directly to a CPU bus, assigned addresses in the processor 104's address space, and synchronized to a single bus clock. PCI cards that can be used in the plurality of PCI slots 170 include, but are not limited to, network interface cards (NICs), sound cards, modems, TV tuner cards, disk controllers, video cards, small computer system interface (SCSI) adapters, and personal computer memory card international association (PCMCIA) cards.

The SB logic 108 can couple the PCI Bus 107 to a plurality of expansion cards or ISA slots 150 (e.g., an ISA slot 151) via an expansion bus. The expansion bus can be a bus used for communications between the SB logic 108 and peripheral devices, and may include, but is not limited to, an industry standard architecture (ISA) bus, PC/104 bus, low pin count bus, extended ISA (EISA) bus, universal serial bus (USB), integrated drive electronics (IDE) bus, or any other suitable bus that can be used for data communications for peripheral devices.

In system 100, the SB logic 108 is further coupled to a management device 103 that is connected to the at least one PSU 102. In some implementations, the management device 103 can be a baseboard management controller (BMC), rack management controller (RMC), or any other suitable type of system controller. The management device 103 can be configured to receive firmware update by communicating with a computing device or user device via a network.

In this example, BIOS 105 can be any program instructions or firmware configured to initiate and identify various components of the server system 100. The BIOS is an important system component that is responsible for initializing and testing hardware components of a corresponding server system. The BIOS can provide an abstraction layer for the hardware components thereby providing a consistent way for applications and operating systems to interact with a peripheral device such as a keyboard, a display, and other input/output devices.

In some configurations, the BIOS 105 can run a system check prior to booting up an operating system (OS), e.g., the Microsoft Windows® OS, the Linux® OS, or any operating system, on the server system 100. The system check is a diagnostic system examination executed during initialization of the server system 100. An example of the system check includes a Power-On Self-Test (POST). The BIOS can handle major functions of POST, and may offload some duties to other programs designed to initialize specific peripheral devices (e.g., video and small computer system interface (SCSI) initialization). The major functions of POST may include: verifying CPU registers and the integrity of the firmware code; checking basic components; examining system main memory; and passing control to other specialized firmware extension. In some configurations, the BIOS may also handle additional POST's functions including: discovering, initializing, and cataloging all system buses and devices; providing a user interface for updating system's configuration; and constructing a system environment required by the operating system.

The management device 103 (e.g., BMC) can communicate with processor 104 and storage device 111. This communication can be via Intelligent Platform Management Interface (IPMI) messages using a system bus (e.g., Intelligent Platform Management Bus/Bridge (IPMB)). IPMB is an enhanced implementation of inter-integrated circuit ($I^2C$) bus and is a message-based, hardware-level basic interface specification. However, any other methods for communication with the management device 103 can be used without limitation.

The management device 103 can communicate with a computing device or a user device via a network. In some configurations, the management device 103 can communicate with the computing device or the user device even, when the server system 100 is powered off. For example, the management device 103 can communicate with the computing device or the user device out-of-band using a remote management control protocol (RMCP) or RMCP+ for IPMI over a local area network (LAN).

In some implementations, the management device 103 can determine whether a firmware update is available from a vendor and automatically download the firmware update from the vendor. The management device 103 can further save the firmware update. In some examples, the management controller can monitor availability of firmware updates by communicating with a central management server and download latest firmware updates whenever the updates become available. In some examples, the management controller can receive the future BIOS settings out-of-band when the server system is not in operation, or even when the server system is powered off.

In some configurations, the management device 103 is configured to control operations of the at least one PSU 102 and/or other applicable operations. In some implementations, the management device 103 may be configured to monitor processing demands, and components and/or connection status of the server system 100.

In this example, a user can revise and store future firmware settings on the management device 103. The management device 103 then sends the future firmware settings to the BIOS 105 to be applied to the server system 100. The BIOS 105 can send current firmware settings to the management device 103 using a unique string mapping scheme before performing an entire firmware flash update. The management device 103 can copy the received current firmware settings to the future firmware settings, and cause the server system 100 to be rebooted by applying the future firmware settings stored on the management device 103. This process is described in greater detail below with respect to FIGS. 2A-2C.

Table 1 illustrates an exemplary unique string mapping scheme, in accordance with an implementation of the present disclosure. In this example, each BIOS option name is mapped to a unique string. For example, "Option A1" in Table 1 is mapped to a unique string "OPTA001."

TABLE 1

An example of mapping real option name to unique strings

| Real option name | BIOS V1 unique string | BIOS V2 unique string |
|---|---|---|
| Option A1 | OPTA001 | OPTA001 |
| Option A1 | OPTA002 | OPTA002 |
| Option A2 | OPTA003 | OPTA003 |
| Option B1 | OPTB001 | OPTB001 |
| Option B2 | OPTB002 | OPTB002 |
| Option A3 | | OPTA004 |

In some implementations, a BIOS option can be changed and recorded in a specific BIOS region with a unique string mapping type. For example, when BIOS firmware is updated from version 1 (V1) to version 2 (V2), the specific BIOS region will be preserved during the BIOS flash update. However, it may be difficult to preserve the specific BIOS region because BIOS region layout information is lacking.

Table 2 illustrates an example table recording of changed BIOS options with unique string mapping types. In this example, Option A3 and Option B2 are changed from "Disabled" in a default setting to "Enabled" in a current setting. Option A3 and Option B2 are recorded in Table 2 with a unique mapping type "Enabled." Table 2 can be stored in the specific BIOS region. The specific BIOS region is preserved during BIOS flash update.

TABLE 2

An example of recording changed BIOS options with a unique string mapping type

| OPTA003 | Enabled |
|---------|---------|
| OPTA002 | Enabled |

Although only certain components are shown within the exemplary system 100 in FIG. 1, various types of electronic or computing components that are capable of processing or storing data, receiving or transmitting signals, or providing fresh air to downstream components, can also be included in the exemplary systems 100. Further, the electronic or computing components in the exemplary system 100 can be configured to execute various types of application, and/or can use various types of operating systems. These operating systems can include, but are not limited to, Android, Berkeley Software Distribution (BSD), iPhone OS (iOS), Linux, OS X, Unix-like Real-time Operating System (e.g., QNX), Microsoft Windows, Window Phone, and IBM z/OS.

Depending on the desired implementation for the exemplary system 100, a variety of networking and messaging protocols can be used, including but not limited to TCP/IP, open systems interconnection (OSI), file transfer protocol (FTP), universal plug and play (UpnP), network file system (NFS), common internet file system (CIFS), AppleTalk etc. As would be appreciated by those skilled in the art, the exemplary system 100 illustrated in FIG. 1 is used for purposes of explanation. Therefore, a network system can be implemented with many variations, as appropriate, yet still provide a configuration of network platform in accordance with various examples of the present disclosure.

In exemplary configuration of FIG. 1, the exemplary system 100 can also include one or more wireless components operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections, as known in the art. Various other elements and/or combinations are possible as well within the scope of various examples.

The above discussion is meant to be illustrative of the principles and various examples of the present disclosure. Numerous variations and modifications will become apparent once the above disclosure is fully appreciated.

Figure 2A:
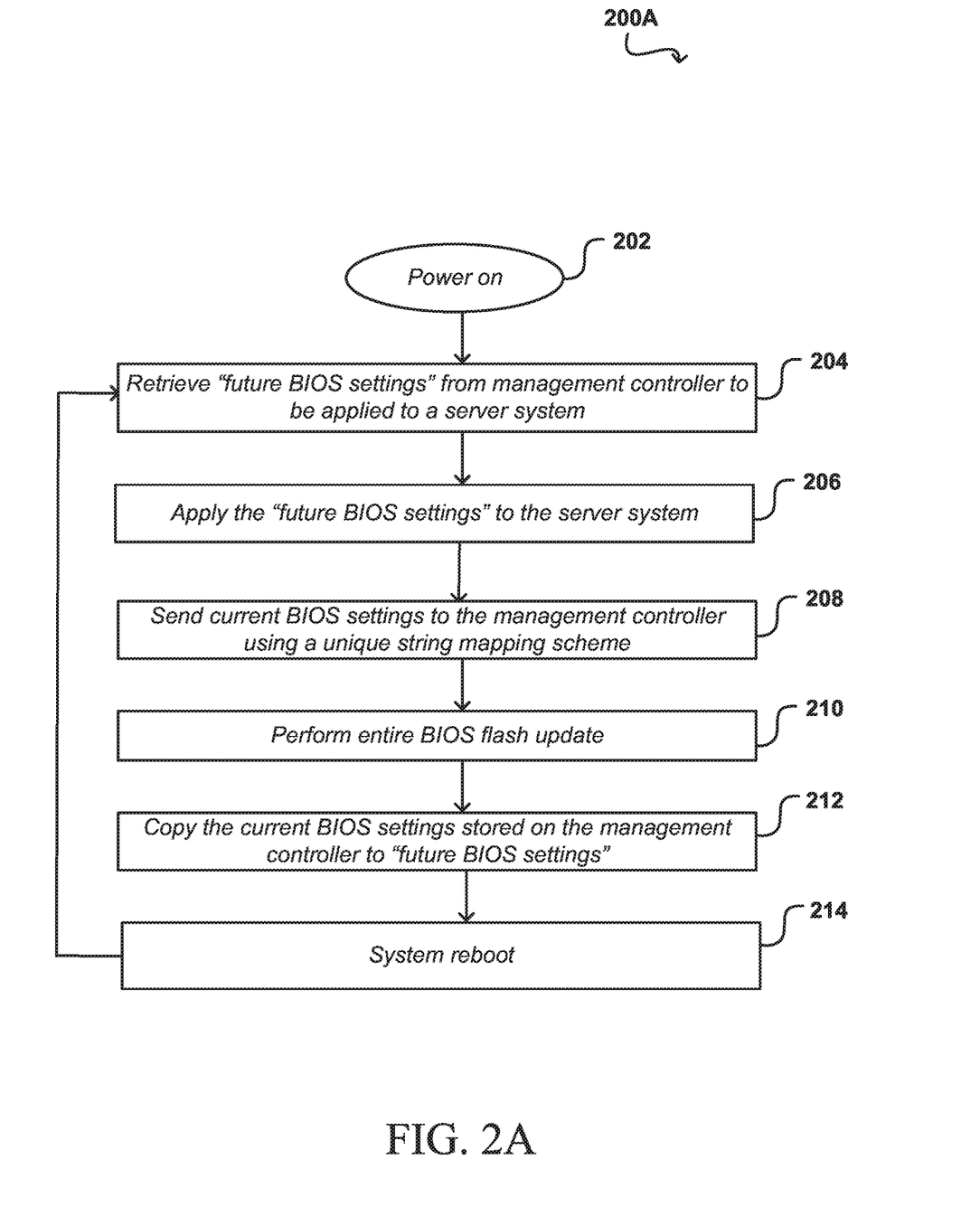
FIGS. 2A-2C are exemplary methods for automatically preserving firmware settings in accordance with an implementation of the present disclosure.

FIG. 2A illustrates an exemplary method 200A for automatically preserving firmware settings using a BIOS and a management controller (e.g., BMC) of a server system in accordance with an implementation of the present disclosure. It should be understood that the exemplary method 200A is presented solely for illustrative purposes, and that in other methods in accordance with the present disclosure can include additional, fewer, or alternative steps performed in similar or alternative orders, or in parallel. The exemplary method 200A starts at step 202 by powering on the server system.

At step 204, BIOS of the server system can retrieve "future BIOS settings" from the management controller (e.g., BMC) of the server system. In some examples, the management controller can provide an interface for a user to input or update the "future BIOS settings." In some examples, the management controller can communicate with a central management server to monitor availability of firmware updates and download the latest firmware updates whenever the updates become available.

At step 206, BIOS can apply the "future BIOS settings" to the server system, as illustrated in FIG. 1. At step 208, BIOS further sends "current BIOS settings" to the management controller using a unique string mapping scheme, as illustrated in Table 1. In some examples, the unique string mapping scheme comprises mapping each of the plurality of BIOS settings to a unique string. In some implementations, the unique string mapping scheme further comprises recording a changed BIOS setting with a unique string mapping type, as illustrated in Table 2.

At step 210, BIOS can perform an entire BIOS flash update. Further, BIOS can cause the current BIOS settings on the management controller to be copied to the future BIOS settings of the management controller, at step 212. BIOS can further reboot the server system and retrieve the future BIOS settings stored on the management controller, at step 214. In some implementations, steps 210-214 can be performed by BMC.

Figure 2B:
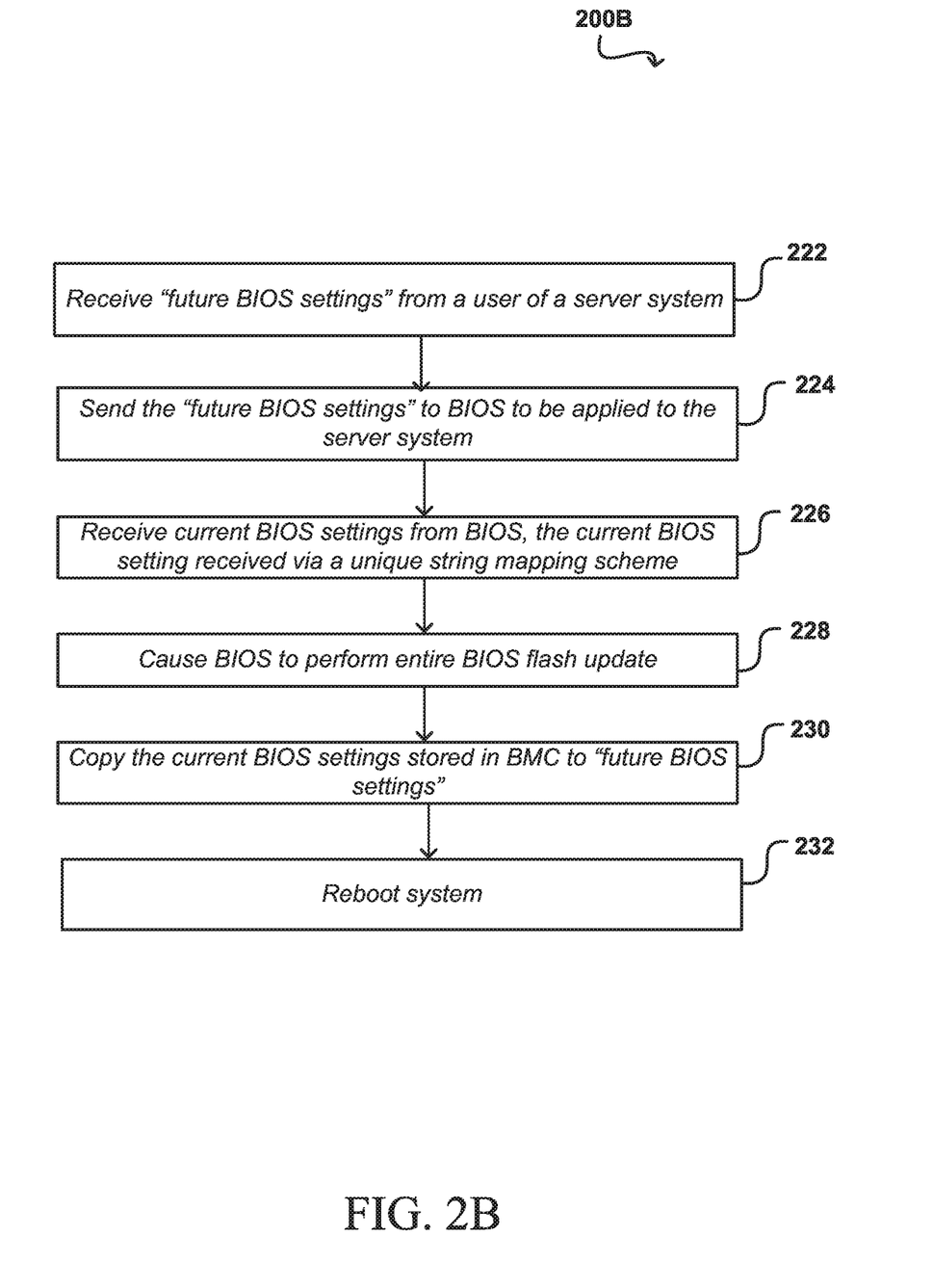

FIG. 2B illustrates an exemplary method 200B for automatically preserving firmware settings using a management controller (e.g., BMC) of a server system in accordance with an implementation of the present disclosure. The exemplary method 200B starts at step 222, the management controller can receive future BIOS settings from a local device or a remote resource. In some examples, the management controller can monitor availability of firmware updates by communicating with the central management server and download latest firmware updates whenever the updates become available. In some examples, the management controller can receive the future BIOS settings out-of-band when the server system is not in operation or even when the server system is powered off.

At step 224, the management controller can send the future BIOS settings to BIOS of the server system to be applied to the server system. At step 226, the management controller can receive current BIOS settings from BIOS and then store them on the management controller. In some examples, the current BIOS settings are received from BIOS via a unique string mapping scheme. The unique string mapping scheme comprises mapping each of the current BIOS settings to a unique string, as illustrated in Table 1.

At step 228, the management controller can cause BIOS to perform entire BIOS flash update. The management controller can further copy stored current BIOS settings to the future BIOS settings of the management controller, at step 230. The server system reboots from the future BIOS settings of the management controller, at step 232.

Figure 2C:
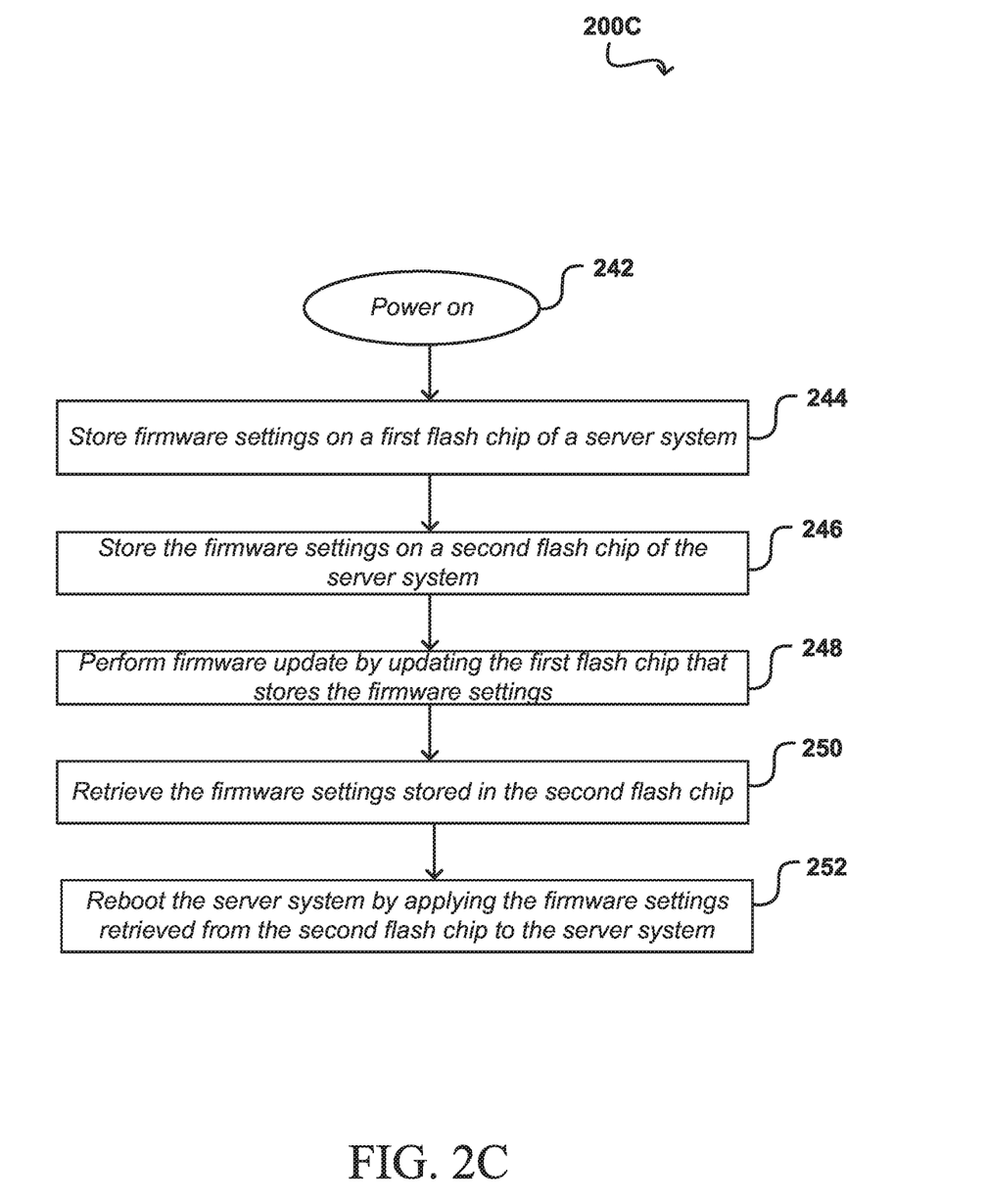

FIG. 2C illustrates an exemplary method 200C for automatically preserving firmware settings using a BIOS and flash chips of a server system in accordance with an implementation of the present disclosure. The exemplary method 200C starts at step 242, powering up the server system. At step 244, BIOS of the server system can store firmware settings of the server system on a first flash chip of the server system. At step 246, BIOS of the server system can store the firmware settings of the server system on a second flash chip of the server system. In some examples, the firmware settings are current firmware settings that have incorporated all prior changes.

At step 248, BIOS can perform firmware update by updating the first flash chip that stores the firmware settings. In some examples, the firmware update may further comprise incorporate "future firmware settings" to the firmware settings stored on the second flash chip. The "future firmware settings" are firmware settings that need to be changed in a next system reboot.

At step 250, BIOS can retrieve the firmware settings from the second flash chip. BIOS can further reboot the server system by applying the firmware settings retrieved from the second flash chip to the server system, at step 252.

Figure 3:
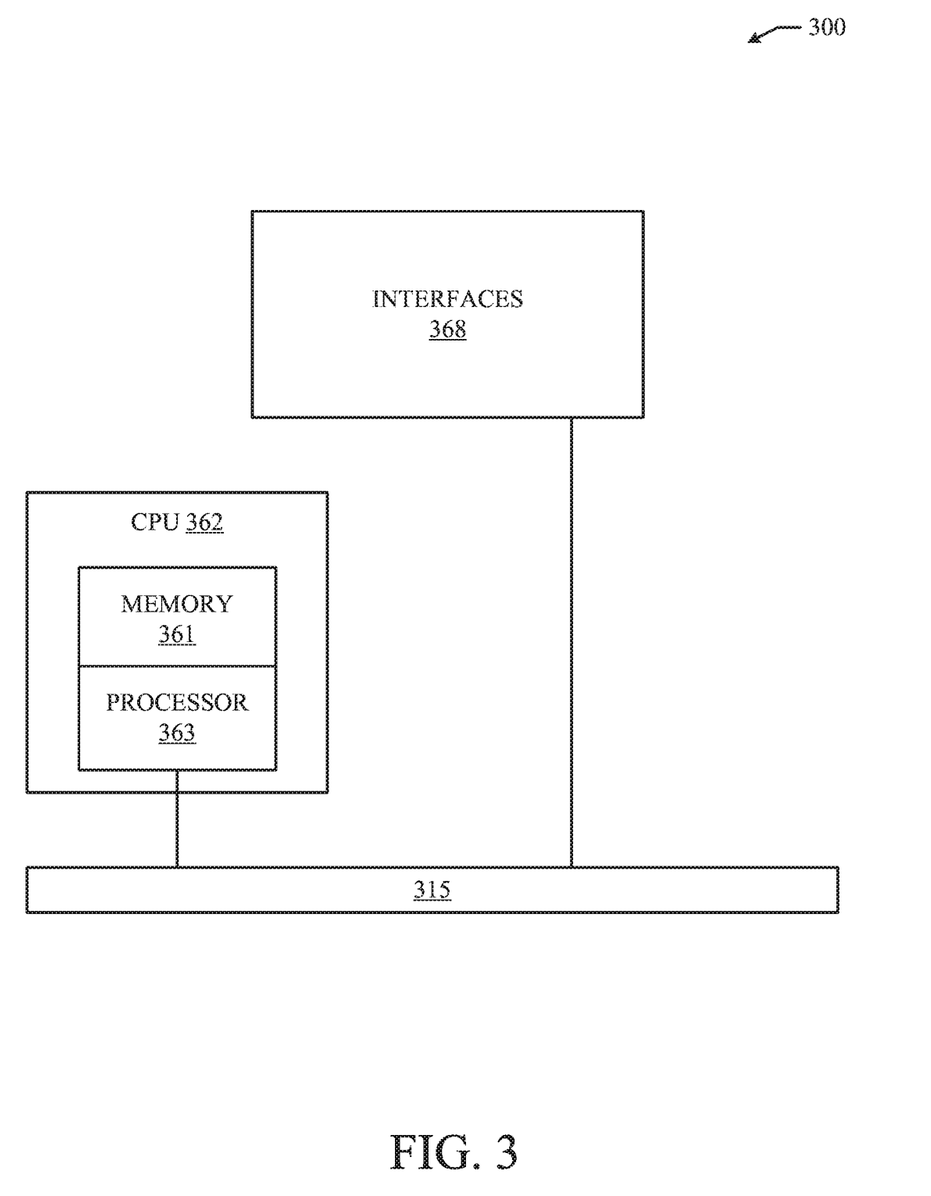
FIG. 3 illustrates an exemplary computing device in accordance with various implementations of the disclosure.
Figure 4:
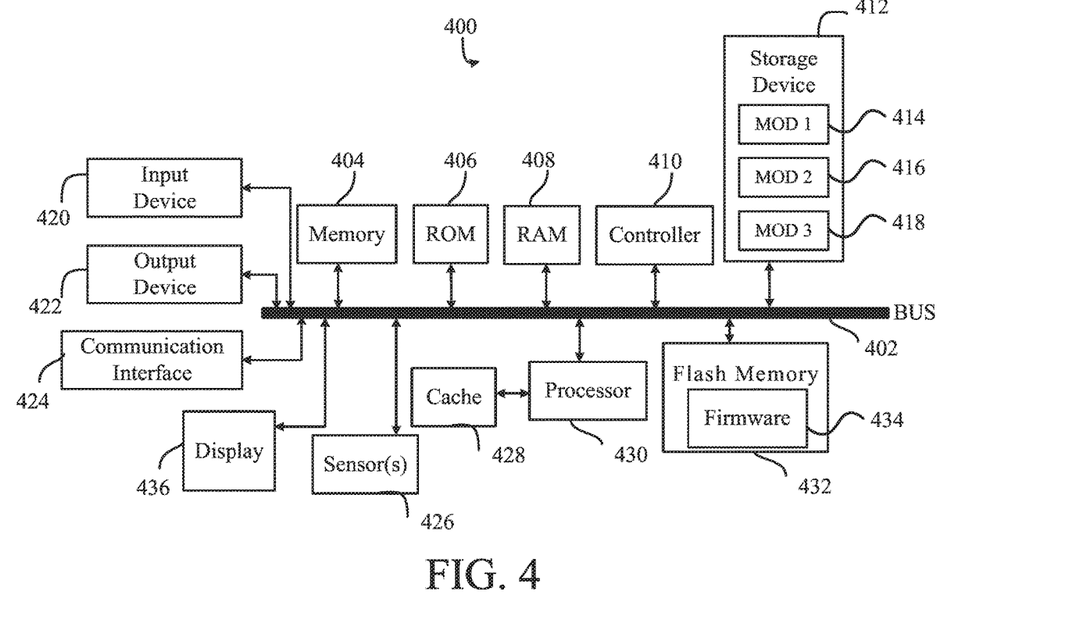
FIGS. 4 and 5 illustrate exemplary systems in accordance with various examples of the present disclosure.
Figure 5:
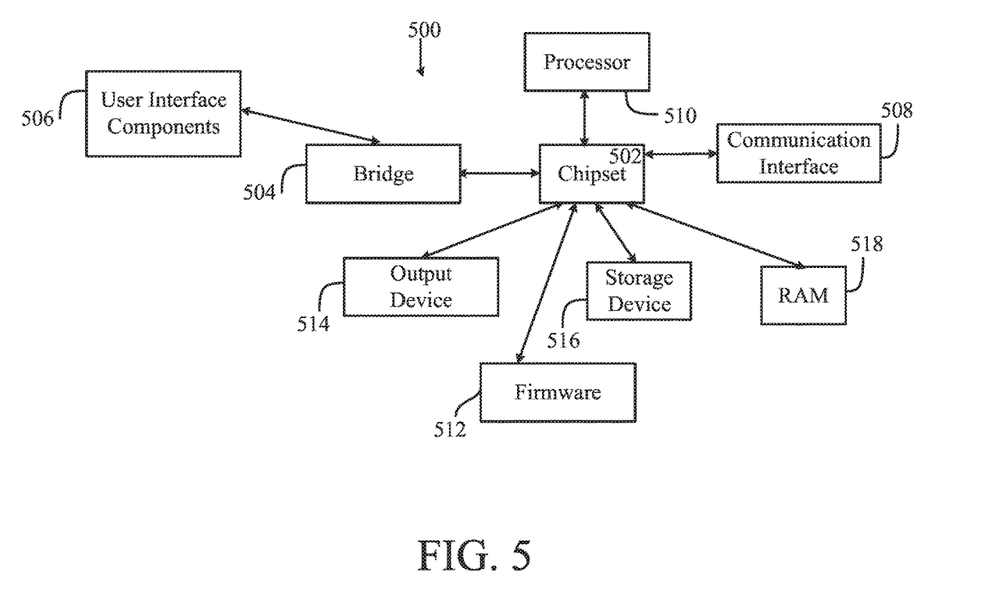

The disclosed technology addresses the need in the art for automatically preserving firmware settings in computing systems. A brief introductory description of example systems and networks, as illustrated in FIGS. 3-5, is disclosed herein. These variations shall be described herein as the various examples are set forth.

FIG. 3 illustrates an example computing device 300 suitable for implementing the present disclosure. Computing device 300 includes a master central processing unit (CPU) 362, interfaces 368, and a bus 315 (e.g., a PCI bus). When acting under the control of appropriate software or firmware, the CPU 362 is responsible for executing packet management, error detection, and/or routing functions, such as miscabling detection functions, for example. The CPU 362 preferably accomplishes all these functions under the control of software, including an operating system and any appropriate applications software. CPU 362 can include one or more processors 363 such as a processor from the Motorola family of microprocessors, or the MIPS family of microprocessors. In an alternative example, processor 363 is specially designed hardware for controlling the operations of the computing device 300. In a specific example, a memory 361 (such as non-volatile RAM and/or ROM) also forms part of CPU 362. However, there are many different ways in which memory could be coupled to the system.

The interfaces 368 are typically provided as interface cards (sometimes referred to as "line cards"). Generally, they control the sending and receiving of data packets over the network and sometimes support other peripherals used with the computing device 300. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces can include ports appropriate for communication with the appropriate media. In some cases, they can also include an independent processor and, in some instances, volatile RAM. The independent processors can control such communications intensive tasks as packet switching, media control, and management. By providing separate processors for the communications intensive tasks, these interfaces allow the master microprocessor 362 to efficiently perform routing computations, network diagnostics, security functions, etc.

Although the system shown in FIG. 3 is one specific computing device of the present disclosure, it is by no means the only network device architecture on which the present patent application can be implemented. For example, an architecture having a single processor that handles communications as well as routing computations, etc. is often used. Further, other types of interfaces and media could also be used with the router.

Regardless of the network device's configuration, it can employ one or more memories or memory modules (including memory 361) configured to store program instructions for the general-purpose network operations and mechanisms for roaming, route optimization and routing functions described herein. The program instructions can control the operation of an operating system and/or one or more applications, for example. The memory or memories can also be configured to store tables such as mobility binding, registration, and association tables, etc.

FIGS. 4 and 5 illustrate example system embodiments. The more appropriate embodiment will be apparent to those of ordinary skill in the art when practicing the present disclosure. Persons of ordinary skill in the art will also readily appreciate that other system embodiments are possible.

FIG. 4 illustrates a system bus computing system architecture 400 wherein the components of the system are in electrical communication with each other using a bus 402. Example system 400 includes a processing unit (CPU or processor) 430 and a system bus 402, that couples various system components including the system memory 404, such as read only memory (ROM) 406 and random access memory (RAM) 408, to the processor 430. The system 400 can include a cache of high-speed memory connected directly with, in close proximity to, or integrated as part of the processor 430. The system 400 can copy data from the memory 404 and/or the storage device 412 to the cache 428 for quick access by the processor 430. In this way, the cache can provide a performance boost that avoids processor 430 delays while waiting for data. These and other modules can control or be configured to control the processor 430 to perform various actions. Other system memory 404 may be available for use as well. The memory 404 can include multiple different types of memory with different performance characteristics. The processor 430 can include any general purpose processor and a hardware module or software module, such as module 1 414, module 2 416, and module 3 418 stored in storage device 412, configured to control the processor 430, as well as a special-purpose processor where software instructions are incorporated into the actual processor design. The processor 430 may essentially be a completely self-contained computing system, containing multiple cores or processors, a bus, memory controller, cache, etc. A multi-core processor may be symmetric or asymmetric.

To enable user interaction with the computing device 400, an input device 420 can represent any number of input mechanisms, such as a microphone for speech, a touch-sensitive screen for gesture or graphical input, keyboard, mouse, motion input, and so forth. An output device 422 can also be one or more of a number of output mechanisms known to those of skill in the art. In some instances, multimodal systems can enable a user to provide multiple types of input to communicate with the system 400. The communications interface 424 can generally govern and manage the user input and system output. There is no restriction on operating on any particular hardware arrangement, and therefore the basic features here may easily be substituted for improved hardware or firmware arrangements as they are developed.

Storage device 412 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 408, read only memory (ROM) 406, and hybrids thereof.

The storage device 412 can include software modules 414, 416, 418 for controlling the processor 430. Other hardware or software modules are contemplated. The storage device 412 can be connected to the system bus 402. In one aspect, a hardware module that performs a particular function can include the software component stored in a computer-readable medium in connection with the necessary hardware components, such as the processor 430, bus 402, display 436, and so forth, to carry out the function.

The controller 410 can be a specialized microcontroller or processor on the system 400, such as a BMC (baseboard management controller). In some cases, the controller 410 can be part of an Intelligent Platform Management Interface (IPMI). Moreover, in some cases, the controller 410 can be embedded on a motherboard or main circuit board of the system 400. The controller 410 can manage the interface between system management software and platform hardware. The controller 410 can also communicate with various system devices and components (internal and/or external), such as controllers or peripheral components, as further described below.

The controller 410 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 410 to initiate or conduct specific hardware recovery procedures or operations, as further described below.

Different types of sensors (e.g., sensors 426) on the system 400 can report to the controller 410 on parameters such as cooling fan speeds, power status, operating system (OS) status, hardware status, and so forth. The controller 410 can also include a system event log controller and/or storage for managing and maintaining events, alerts, and notifications received by the controller 410. For example, the controller 410 or a system event log controller can receive alerts or notifications from one or more devices and components, and maintain the alerts or notifications in a system event log storage component.

Flash memory 432 can be an electronic non-volatile computer storage medium or chip which can be used by the system 400 for storage and/or data transfer. The flash memory 432 can be electrically erased and/or reprogrammed. Flash memory 432 can include erasable programmable read-only memory (EPROM), electrically erasable programmable read-only memory (EEPROM), ROM, NVRAM, or complementary metal-oxide semiconductor (CMOS), for example. The flash memory 432 can store the firmware 434 executed by the system 400 when the system 400 is first powered on, along with a set of configurations specified for the firmware 434. The flash memory 432 can also store configurations used by the firmware 434.

The firmware 434 can include a Basic Input/Output System or its successors or equivalents, such as an Extensible Firmware Interface (EFI) or Unified Extensible Firmware Interface (UEFI). The firmware 434 can be loaded and executed as a sequence program each time the system 400 is started. The firmware 434 can recognize, initialize, and test hardware present in the system 400 based on the set of configurations. The firmware 434 can perform a self-test, such as a Power-on-Self-Test (POST), on the system 400. This self-test can test functionality of various hardware components such as hard disk drives, optical reading devices, cooling devices, memory modules, expansion cards, and the like. The firmware 434 can address and allocate an area in the memory 404, ROM 406, RAM 408, and/or storage device 412, to store an operating system (OS). The firmware 434 can load a boot loader and/or OS, and give control of the system 400 to the OS.

The firmware 434 of the system 400 can include a firmware configuration that defines how the firmware 434 controls various hardware components in the system 400. The firmware configuration can determine the order in which the various hardware components in the system 400 are started. The firmware 434 can provide an interface, such as an UEFI, that allows a variety of different parameters to be set, which can be different from parameters in a firmware default configuration. For example, a user (e.g., an administrator) can use the firmware 434 to specify clock and bus speeds; define what peripherals are attached to the system 400; set monitoring of health (e.g., fan speeds and CPU temperature limits); and/or provide a variety of other parameters that affect overall performance and power usage of the system 400.

While firmware 434 is illustrated as being stored in the flash memory 432, one of ordinary skill in the art will readily recognize that the firmware 434 can be stored in other memory components, such as memory 404 or ROM 406, for example. However, firmware 434 is illustrated as being stored in the flash memory 432 as a non-limiting example for explanation purposes.

System 400 can include one or more sensors 426. The one or more sensors 426 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 426 can communicate with the processor, cache 428, flash memory 432, communications interface 424, memory 404, ROM 406, RAM 408, controller 410, and storage device 412, via the bus 402, for example. The one or more sensors 426 can also communicate with other components in the system via one or more different means, such as inter-integrated circuit (I2C), general purpose output (GPO), and the like.

FIG. 5 illustrates an example computer system 500 having a chipset architecture that can be used in executing the described method(s) or operations, and generating and displaying a graphical user interface (GUI). Computer system 500 can include computer hardware, software, and firmware that can be used to implement the disclosed technology. System 500 can include a processor 510, representative of any number of physically and/or logically distinct resources capable of executing software, firmware, and hardware configured to perform identified computations. Processor 510 can communicate with a chipset 502 that can control input to and output from processor 510. In this example, chipset 502 outputs information to output device 514, such as a display, and can read and write information to storage device 516, which can include magnetic media, and solid state media, for example. Chipset 502 can also read data from and write data to RAM 518. A bridge 504 for interfacing with a variety of user interface components 506, can be provided for interfacing with chipset 502. Such user interface components 506 can include a keyboard, a microphone, touch detection and processing circuitry, a pointing device, such as a mouse, and so on. In general, inputs to system 500 can come from any of a variety of sources, machine generated and/or human generated.

Chipset 502 can also interface with one or more communication interfaces 508 that can have different physical interfaces. Such communication interfaces can include interfaces for wired and wireless local area networks for broadband wireless networks, and for personal area networks. Some applications of the methods for generating, displaying, and using the GUI disclosed herein can include receiving ordered datasets over the physical interface or be generated by the machine itself by processor 510 analyzing data stored in storage 516 or 518. Further, the machine can receive inputs from a user via user interface components 506 and execute appropriate functions, such as browsing functions by interpreting these inputs using processor 510.

Moreover, chipset 502 can also communicate with firmware 512, which can be executed by the computer system 500 when powering on. The firmware 512 can recognize, initialize, and test hardware present in the computer system 500 based on a set of firmware configurations. The firmware 512 can perform a self-test, such as a POST, on the system 500. The self-test can test the functionality of the various hardware components 502-518. The firmware 512 can address and allocate an area in the memory 518 to store an OS. The firmware 512 can load a boot loader and/or OS, and give control of the system 500 to the OS. In some cases, the firmware 512 can communicate with the hardware components 502-510 and 514-518. Here, the firmware 512 can communicate with the hardware components 502-510 and 514-518 through the chipset 502 and/or through one or more other components. In some cases, the firmware 512 can communicate directly with the hardware components 502-510 and 514-518.

It can be appreciated that example systems 300, 400 and 500 can have more than one processor (e.g., 363, 430, 510) or be part of a group or cluster of computing devices networked together to provide greater processing capability.

For clarity of explanation, in some instances, the present disclosure may be presented as including functional blocks including devices, device components, steps, or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used, can be accessible over a network. The computer executable instructions may be, for example, binaries and intermediate format instructions, such as assembly language, firmware, or source code. Examples of computer-readable media that may be used to store instructions, information used, and/or information created during methods according to the described examples, include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rack-mount devices, standalone devices, and so on. Functionality described herein also can be embodied in peripherals or add-in cards. Such functionality can also be implemented on a circuit board among different chips, or different processes executing in a single device, by way of further example.

The instructions, media for conveying such instructions, computing resources for executing them, and other structures for supporting such computing resources, are means for providing the functions described herein.

The various examples can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless, and handheld devices running mobile software, and capable of supporting a number of networking and messaging protocols. Such a system can also include a number of workstations running any of a variety of commercially-available operating systems, and other known applications for purposes such as development and database management. These devices can also include other electronic devices, such as dummy terminals, thin-clients, gaming systems and other devices capable of communicating via a network.

To the extent examples, or portions thereof, are implemented in hardware, the present disclosure can be implemented with any, or a combination of, the following technologies: a discrete logic circuit(s) having logic gates for implementing logic functions upon data signals; an application specific integrated circuit (ASIC) having appropriate combinational logic gates; programmable hardware such as a programmable gate array(s) (PGA); a field programmable gate array (FPGA); etc.

Most examples utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network, and any combination thereof.

Methods according to the above-described examples can be implemented using computer-executable instructions that are stored, or are otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples, include magnetic or optical disks, flash memory, USB devices provided with non-volatile memory, networked storage devices, and so on.

Devices implementing methods, according to these technologies, can include hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips, or different processes executing in a single device, by way of further example.

In examples that utilize a Web server, the Web server can run any variety of server or mid-tier applications, including HTTP servers, FTP servers, CGI servers, data servers, Java servers, and business application servers. In response to requests from user devices, the Web server(s) can also be capable of executing programs or scripts. For example, the Web server can execute one or more Web applications, which can be implemented as one or more scripts or programs written in any programming language, such as Java®, C, C# or C++ or any scripting language, such as Perl, Python or TCL, as well as combinations thereof. The Web server(s) can also encompass database servers, including those commercially available on the open market.

The server system can include a variety of data stores and other memory and storage media, as discussed above. These can reside in a variety of locations, such as on a storage medium local to (and/or resident in) one or more of the computers, or remote from any or all of the computers across the network. In a particular set of examples, the information can reside in a storage-area network (SAN) familiar to those skilled in the art. Similarly, any necessary files for performing the functions attributed to the computers, servers or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad), and at least one output device (e.g., a display device, printer or speaker). Such a system can also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a wireless or wired network card, an infrared computing device) and working memory, as described above. The computer-readable storage media reader can be connected with, or configured to receive, a computer-readable storage medium representing remote, local, fixed, and/or removable storage devices, as well as storage media for temporarily and/or more permanently containing, storing, transmitting and retrieving computer-readable information. The system and various devices will also typically include a number of software applications, modules, services or other elements located within at least one working memory device, including an operating system, and application programs such as a client application or Web browser. It should be appreciated that alternate examples can have numerous variations from those described above. For example, customized hardware might also be used and/or particular elements might be implemented in hardware, software (including portable software, such as applets), or both. Further, connection to other computing devices, such as network input/output devices, can be employed.

Storage media and computer readable media for containing code, or portions of code, can include any appropriate media known or used in the art, including storage media and computing media. The storage media and computing media can include, but are not limited to, volatile and non-volatile, removable and non-removable media for storage and/or transmission of data or information. The removable and non-removable media comprise RAM, ROM, EPROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. The data or information can include computer readable instructions, data structures, program modules, or other data. Based on the technology and teachings provided herein, a person of ordinary skill in the art will appreciate other ways and/or methods to implement the various aspects of the present disclosure.

The specification and drawings are, accordingly, to be regarded in an illustrative rather than a restrictive sense. It will, however, be evident that various modifications and changes can be made thereunto without departing from the broader spirit and scope of the patent application, as set forth in the claims.

What is claimed is:

1. A computer-implemented method for preserving firmware settings of a server system in a datacenter, comprising:
    powering on the server system;
    retrieving a plurality of future firmware settings from a component of the server system, wherein the future firmware settings are firmware settings that need to be changed after a reboot;
    applying the plurality of future firmware settings to the server system, wherein the applied plurality of future firmware settings is defined as current firmware settings currently on the server system;
    sending the plurality of the current firmware settings currently on the server system to the component in the form of unique strings, wherein each of the plurality of current firmware settings are mapped to a unique string;
    storing the plurality of current firmware settings on the component in the form of the unique strings;
    performing an entire firmware flash update;
    copying the plurality of current firmware settings stored on the component to replace the plurality of future firmware settings stored on the component; and
    rebooting the server system by applying the replaced plurality of future firmware settings stored on the component.

2. The computer-implemented method of claim 1, wherein the component is a management controller of the server system.

3. The computer-implemented method of claim 2, wherein the management controller is connected to a network and is accessible out-of-band.

4. The computer-implemented method of claim 3, wherein the future firmware settings is changeable via the management controller when the server system is not in operation, or even when the server system is powered off.

5. The computer-implemented method of claim 2, wherein the management controller is a baseboard management controller (BMC), or a rack management controller (RMC).

6. The computer-implemented method of claim 1, wherein the unique string mapping scheme comprises mapping each of the plurality of current firmware settings to a unique string.

7. The computer-implemented method of claim 6, wherein the unique string mapping scheme further comprises recording a changed current firmware setting of the plurality of current firmware settings with a unique string mapping type.

8. The computer-implemented method of claim 1, wherein the component is a flash chip of the server system.

9. A system, comprising:
a processor; and
a computer-readable medium storing instructions that, when executed by the processor, cause the system to perform operations comprising:
powering on the system;
retrieving a plurality of future firmware settings from a component of the system, wherein the future firmware settings are firmware settings that need to be changed after a reboot;
applying the plurality of future firmware settings to the system, wherein the applied plurality of future firmware settings is defined as current firmware settings currently on the server system;
sending the plurality of the current firmware settings currently on the server system to the component in the form of unique strings, wherein each of the plurality of current firmware settings are mapped to a unique string;
storing the plurality of current firmware settings on the component in the form of the unique strings;
performing an entire firmware flash update;
copying the plurality of current firmware settings stored on the component to replace the plurality of future firmware settings stored on the component; and
rebooting the system by applying the replaced plurality of future firmware settings stored on the component.

10. The system of claim 9, wherein the component is a management controller of the system.

11. The system of claim 10, wherein the management controller is connected to a network and is accessible out-of-band.

12. The system of claim 11, wherein the future firmware settings are changeable via the management controller when the system is not in operation, or even when the system is powered off.

13. The system of claim 10, wherein the management controller is a baseboard management controller (BMC) or a rack management controller (RMC).

14. The system of claim 9, wherein the unique string mapping scheme comprises mapping each of the plurality of current firmware settings to a unique string.

15. The system of claim 14, wherein the unique string mapping scheme further comprises recording a changed current firmware setting of the plurality of current firmware settings, with a unique string mapping type.

16. The system of claim 9, wherein the component is a flash chip of the system.

17. A non-transitory computer-readable storage medium including instructions that, when executed by at least one processor of a system, cause the system to perform operations comprising:
powering on the server system;
retrieving a plurality of future firmware settings from a component of the server system, wherein the future firmware settings are firmware settings that need to be changed after a reboot;
applying the plurality of future firmware settings to the server system, wherein the applied plurality of future firmware settings is defined as current firmware settings currently on the server system;
sending the plurality of the current firmware settings currently on the server system to the component in the form of unique strings, wherein each of the plurality of current firmware settings are mapped to a unique string;
storing the plurality of current firmware settings on the component in the form of the unique strings;
performing an entire firmware flash update;
copying the plurality of current firmware settings stored on the component to replace the plurality of future firmware settings stored on the component; and
rebooting the server system by applying the replaced plurality of future firmware settings stored on the component.

18. The non-transitory computer-readable storage medium of claim 17, wherein the component is a management controller of the server system.

19. The non-transitory computer-readable storage medium of claim 18, wherein the management controller is a baseboard management controller (BMC) or a rack management controller (RMC).

20. The non-transitory computer-readable storage medium of claim 18, wherein the management controller is connected to a network and is accessible out-of-band, and wherein the future firmware settings is changeable via the management controller when the server system is not in operation, or even when the server system is powered off.

* * * * *